US012641068B2

(12) United States Patent
Lee

(10) Patent No.: US 12,641,068 B2
(45) Date of Patent: May 26, 2026

(54) PROGRAMMABLE DEVICE, VERSION CONTROL SYSTEM, VERSION CONTROL METHOD, AND PROGRAM

(71) Applicant: Mitsubishi Electric Corporation, Tokyo (JP)

(72) Inventor: Weihau Lee, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 19/123,076

(22) PCT Filed: Jun. 20, 2023

(86) PCT No.: PCT/JP2023/022705
§ 371 (c)(1),
(2) Date: Apr. 22, 2025

(87) PCT Pub. No.: WO2024/261847
PCT Pub. Date: Dec. 26, 2024

(65) Prior Publication Data
US 2026/0012443 A1 Jan. 8, 2026

(51) Int. Cl.
*H04L 9/40* (2022.01)
*G06F 11/14* (2026.01)
*G06F 11/1446* (2026.01)

(52) U.S. Cl.
CPC .......... *H04L 63/08* (2013.01); *G06F 11/1458* (2013.01); *G06F 2201/805* (2013.01)

(58) Field of Classification Search
CPC . H04L 63/08; G06F 11/1458; G06F 2201/805
See application file for complete search history.

(56) References Cited

U.S. PATENT DOCUMENTS 9,971,655 B1 * 5/2018 Li ........................ G06F 11/1438
10,243,953 B2 * 3/2019 Kus ...................... H04L 63/0876
(Continued)

FOREIGN PATENT DOCUMENTS

EP 4109287 A1 12/2022
JP H06-332676 A 12/1994
(Continued)

OTHER PUBLICATIONS

International Search Report and Written Opinion mailed on Sep. 12, 2023, received for PCT Application PCT/JP2023/022705, filed on Jun. 20, 2023, 8 pages including English Translation.
(Continued)

*Primary Examiner* — Benjamin A Kaplan
(74) *Attorney, Agent, or Firm* — XSENSUS LLP

(57) ABSTRACT

A PLC includes a storage configured to include a master area and a plurality of user areas corresponding to a plurality of users, a user authenticator that authenticates each user of the plurality of users, and a version controller that causes a first dataset created by the user authenticated by the user authenticator to be stored in the storage and implements version control of the first dataset. The version controller causes the first dataset to be stored in the master area or a user area of the plurality of user areas that corresponds to the user authenticated by the user authenticator, in association with a second dataset that is already stored in the storage and that serves as an immediate parent of the first dataset.

6 Claims, 14 Drawing Sheets

(56) References Cited

U.S. PATENT DOCUMENTS

| | | |
|---|---|---|
| 11,650,833 B1 | 5/2023 | Zogg et al. |
| 12,401,662 B2 * | 8/2025 | Soryal ................. H04L 63/0236 |
| 2017/0075335 A1 | 3/2017 | Takeuchi et al. |

FOREIGN PATENT DOCUMENTS

| | | |
|---|---|---|
| JP | H07-056721 A | 3/1995 |
| JP | H08-320782 A | 12/1996 |
| JP | 2001-325099 A | 11/2001 |
| JP | 2006-268485 A | 10/2006 |
| JP | 2008-282362 A | 11/2008 |
| JP | 2022-135464 A | 9/2022 |
| JP | 7155454 B1 | 10/2022 |
| JP | 7204055 B1 | 1/2023 |
| WO | 2015/136970 A1 | 9/2015 |
| WO | 2022/259374 A1 | 12/2022 |

OTHER PUBLICATIONS

Decision to Grant a Patent mailed on Feb. 27, 2024, received for JP Application 2023-576431, 5 pages including English Translation.

International Search Report and Written Opinion mailed on Sep. 5, 2023, received for PCT Application PCT/JP2023/022710, filed on Jun. 20, 2023, 8 pages including English Translation.

Notice of Reasons for Refusal mailed on Mar. 5, 2024, received for JP Application 2023-576433, 8 pages including English Translation.

Decision to Grant a Patent mailed on Jul. 16, 2024, received for JP Application 2023-576433, 5 pages including English Translation.

Shintaro Iwamura et al., "Concurrent development by multiple developers in an integrated factory automation development environment using an open-source system "Git"", Omron Technics, available online at https://www.omron.com/jp/ja/technology/omrontechnics/2019/20190315-iwamura.html, vol. 51.009JP, Jan. 2019, 7 pages including English Abstract.

Office Action dated Jan. 12, 2026, issued for the corresponding DE patent application No. 112023003976.3 and the English translation, 12pp.

Office Action dated Nov. 16, 2025, issued for the corresponding CN patent application No. 202380090102.4 and the English translation, 12pp.

Office Action dated Mar. 28, 2026, issued for the corresponding CN patent application No. 202380090021.4 and the partial English translation, 10pp.

Office Action dated Mar. 3, 2026, issued for the corresponding DE patent application No. 112023004280.2 and the English translation, 18pp.

* cited by examiner

*FIG. 4*

PROGRAMMABLE DEVICE, VERSION CONTROL SYSTEM, VERSION CONTROL METHOD, AND PROGRAM

CROSS-REFERENCE TO RELATED APPLICATION

This application is a national stage application, pursuant to 35 U.S.C. § 371, of International Patent Application No. PCT/JP2023/022705, filed Jun. 20, 2023, the entire contents of which are incorporated herein by reference.

TECHNICAL FIELD

The present disclosure relates to a programmable device, a version control system, a version control method, and a program.

BACKGROUND ART

Programmable devices for factory automation (FA), such as a programmable logic controller and a motion unit, execute a program created through development by a user to thereby control a control target device. For change point management, progress management, and the like in development, a demand exists for version control of a program and data relating to this program.

As an example relating to the aforementioned circumstance, Patent Literature 1 discloses a programmable logic controller that itself has a version control function.

CITATION LIST

Patent Literature

Patent Literature 1: International Publication No. WO 2022/259374

SUMMARY OF INVENTION

Technical Problem

The programmable logic controller of Patent Literature 1 is not designed for development by multiple people and thus is unable to achieve individual version control for each user. Therefore, when multiple users individually perform program development work, pre-establishing an operation rule among the users, such as the order in which program update is performed for the programmable logic controller, is necessary, which may induce work errors.

In view of the aforementioned circumstances, an objective of the present disclosure is to provide a programmable device and the like that enable easy version control in an environment in which development is performed by multiple people.

Solution to Problem

To achieve the aforementioned objective, a programmable device according to the present disclosure includes storage means configured to include a master area and a plurality of user areas corresponding to a plurality of users, user authenticating means for authenticating each user of the plurality of users, and version controlling means for causing a first dataset created by the user authenticated by the user authenticating means to be stored in the storage means and implementing version control of the first dataset. The version controlling means causes the first dataset to be stored in the master area or a user area of the plurality of user areas that corresponds to the user authenticated by the user authenticating means, in association with a second dataset that is already stored in the storage means and that serves as an immediate parent of the first dataset.

Advantageous Effects of Invention

The present disclosure enables easy version control in an environment in which development is performed by multiple people.

BRIEF DESCRIPTION OF DRAWINGS

FIG. 4 illustrates an example of hardware configuration of the PLC according to Embodiment 1 of the present disclosure and a development device according to Embodiment 2 of the present disclosure;

DESCRIPTION OF EMBODIMENTS

Hereinafter, a version control system according to embodiments of the present disclosure is described with reference to the drawings. In each of the drawings, the same reference sign is assigned to the same or equivalent parts.

US 12,641,068 B2

3
Embodiment 1

Figure 1:
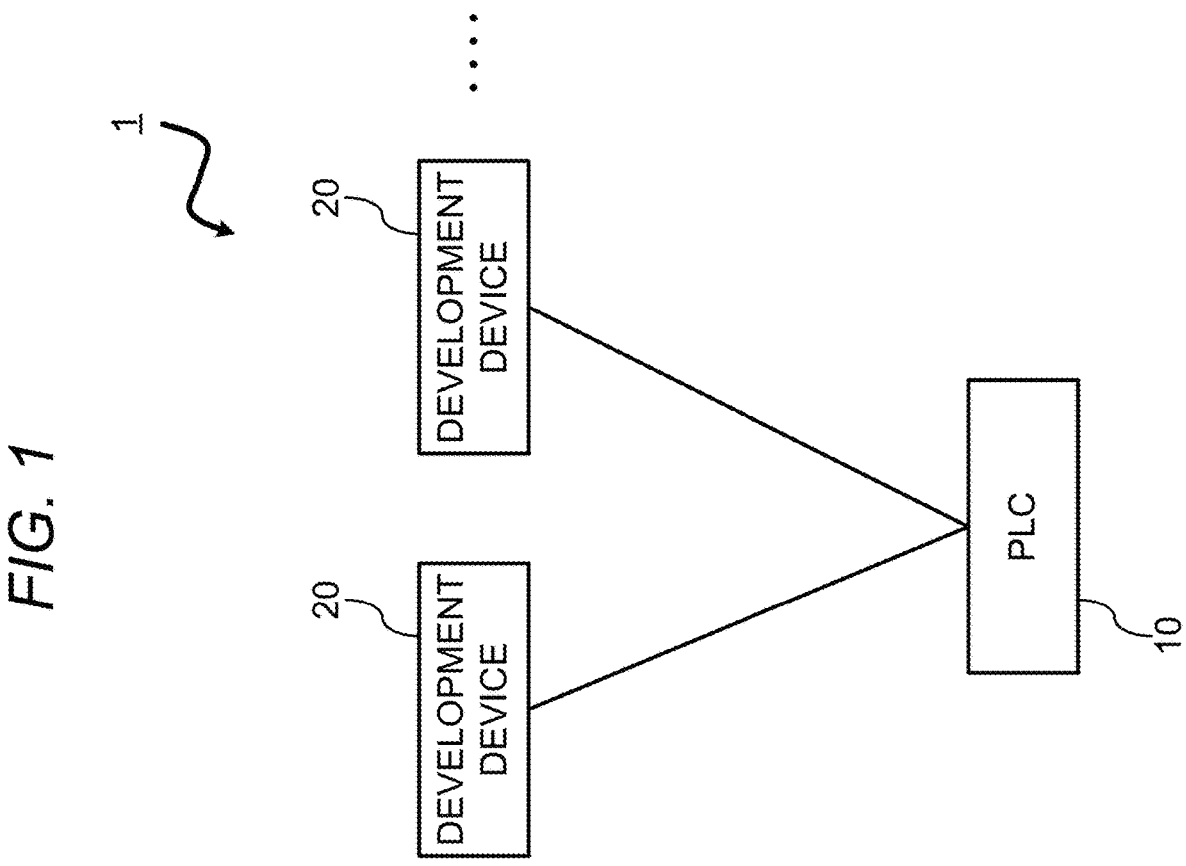
FIG. 1 illustrates overall configuration of a version control system according to Embodiment 1 of the present disclosure.

A version control system 1 according to Embodiment 1 is described with reference to FIG. 1. The version control system 1 includes a programmable logic controller (PLC) 10 and multiple development devices 20. The version control system 1 is an example of a version control system according to the present disclosure.

In the version control system 1, each of multiple users develops, with the corresponding development device 20, a program to be executed by the PLC 10. The user transmits, to the PLC 10, a dataset that is a collection of a program developed with the development device 20 and data relating to this program. The data relating to this program includes, for example, a source code that is the basis of the program, a configuration file and resource file necessary for the program, and a document file that explains the specifications of the program.

For example, the user transmits the dataset to the PLC 10 at every completion of a work of changing the program. The PLC 10 executes the program included in the dataset while implementing version control of the received dataset. In the case of the configuration in which the user transmits the dataset to the PLC 10 at every completion of the changing work, the PLC 10 is taken to implement version control of the dataset at every completion of the changing work.

The PLC 10 executes the program developed by the users to thereby control a non-illustrated control device. In addition to the execution of the program, the PLC 10 implements version control of the dataset, as described above. Functional configuration of the PLC 10 is described below. The PLC 10 is an example of a programmable device according to the present disclosure.

The development device 20 is used for development of the program to be executed by the PLC 10. The development device 20 is, for example, a personal computer with an engineering tool program installed. The user creates, with the development device 20, the dataset including the program to be executed by the PLC 10, and transmits the created dataset to the PLC 10. The development device 20 is an example of a development device according to the present disclosure.

Next, an outline of the version control in the version control system 1 is described. An outline of processes for development of the program in the version control system 1 is described below.

(1) The user creates the dataset including the program through development work.
(2) The PLC 10 authenticates the user.
(3) The user transmits the dataset to the PLC 10.
(4) The PLC 10 implements version control of the received dataset.
(5) The user executes, on the PLC 10, the program included in the dataset transmitted to the PLC 10, and thereby performs debugging work.
(6) Perform fixing work as necessary, and repeats the processes from (1).
(7) Following completion of necessary fixing work, the program is executed on the PLC 10 and multiple users perform operation check.
(8) The user repeats the processes from (1) depending on a result of the operation check.

Of (1)-(8) above, whereas (7) is a work that is performed collaboratively by the multiple users, the others are works that are performed by each individual user. Thus, a configuration is desirable that enables separately controlling the dataset relating to the work to be performed by each individual user and the dataset relating to the collaborative work.

The PLC 10 controls the dataset separately in a master area and user areas that are each for the corresponding user. The master area is an area accessible by any user, and the user area is an area that is accessible only by the corresponding user and inaccessible by the other user. Although the dataset created by the user is stored in the user area in principle, the dataset to be shared among all of the users is stored in the master area in accordance with user operation. Hereinafter, the expression "applying the dataset to the master area" is used to refer to storing the dataset in the master area in accordance with user operation. Examples of the dataset to be shared among all of the users include a dataset including an executable file for which necessary changing work by the user is completed and testing is to be conducted commonly among all of the users, a dataset including an executable file that has reached a level that is acceptable for shipping as a product.

A specific example is described with reference to FIG. 2. Each circle illustrated in FIG. 2 indicates one dataset. Each arrow illustrated in FIG. 2 indicates creating a child dataset with a certain dataset as an immediate parent. When a new dataset is created through performance of a changing work on one dataset, the dataset before the change is the "immediate parent" and the dataset after the change is the "child". A dataset x1 that is the "initial dataset" is created by, for example, storing, upon the PLC 10 firstly receiving a dataset, this dataset in the master area.

Firstly, a user A performs a changing work based on the dataset x1 in the master area and transmits the dataset having undergone this change to the PLC 10. Hereinafter, performing a changing work based on a dataset and transmitting the dataset having undergone this change to the PLC 10 is referred to as "update". Through the update by the user A, a dataset y1 that is a branch from the dataset x1 in the master area is stored in a user A area instead of the master area. The dataset x1 serves as an immediate parent of the dataset y1.

Through the update of the dataset y1 by the user A, a dataset y2 with the dataset y1 as an immediate parent is stored in the user area A. Subsequently, through a similar update work, a dataset y3 with the dataset y2 as an immediate parent is stored in the user area A.

Thereafter, the user A performs a work for applying the dataset y3 to the master area to thereby cause a dataset x2 that is the same as the dataset y3 in content to be stored in the master area with the dataset x1 and the dataset y3 as immediate parents. This dataset x2 is a dataset to which the content of the changing works by the user A between the datasets y1 through y3 is applied. Since the root parent of the dataset y3 is the dataset x1 and the latest dataset in the master area at this phase is the dataset x1, the dataset y3 can be applied to the master area without any problem. The "root parent" herein means a dataset that is reached by tracing back the parent of a dataset for one or more generations. In the example illustrated in FIG. 2, the dataset x1 serves as the "root parent" for any of the datasets y1, y2 and y3.

Next, works of a user B are described. Similarly to the user A, the user B updates the dataset x1 in the master area to thereby store, in a user B area, a dataset z1 that is a branch from the dataset x1 in the master area with the dataset x1 as the immediate parent. The user B sequentially performs the update by two times to thereby store in the user area B a dataset z2 with the dataset z1 as the immediate parent and store in the user area B a dataset z3 with the dataset z2 as the immediate parent. The works of the user B up to this phase are taken to be done before the dataset x2 is stored in the master area.

Thereafter, the user B attempts to apply, to the master area, the dataset z3 to which the content of the own changing works is applied. However, since the latest dataset stored in the master area is not the dataset x1 but is the dataset x2, the attempt to apply the dataset z3 to the master area causes a competition. This state renders applying the dataset z3 unachievable.

Thus, the user B performs a work for merging the dataset z3 to which the latest changing work of the user B is applied and the dataset x2 in the master area, and updates with the dataset changed by this work. This causes a dataset z4 with the dataset z3 as the immediate parent to be stored in the user area B.

Thereafter, the user B performs a work for applying the dataset z4 to the master area to thereby cause a dataset x3 that is the same as the dataset z4 in content to be stored in the master area with the dataset x2 and the dataset z4 as immediate parents.

This dataset x3 is a dataset obtained by merging the content of the changing works by the user B between the datasets z1 through z3 and the content of the dataset x2.

The PLC 10 controls the datasets separately in the master area and the user areas to thereby enable control of the datasets on a per-user basis. This configuration allows each user to focus only on the datasets in the master area and the datasets in the user area corresponding to the user when developing a program, thereby facilitating version control operations in an environment where multiple people are involved in development.

Figure 3:
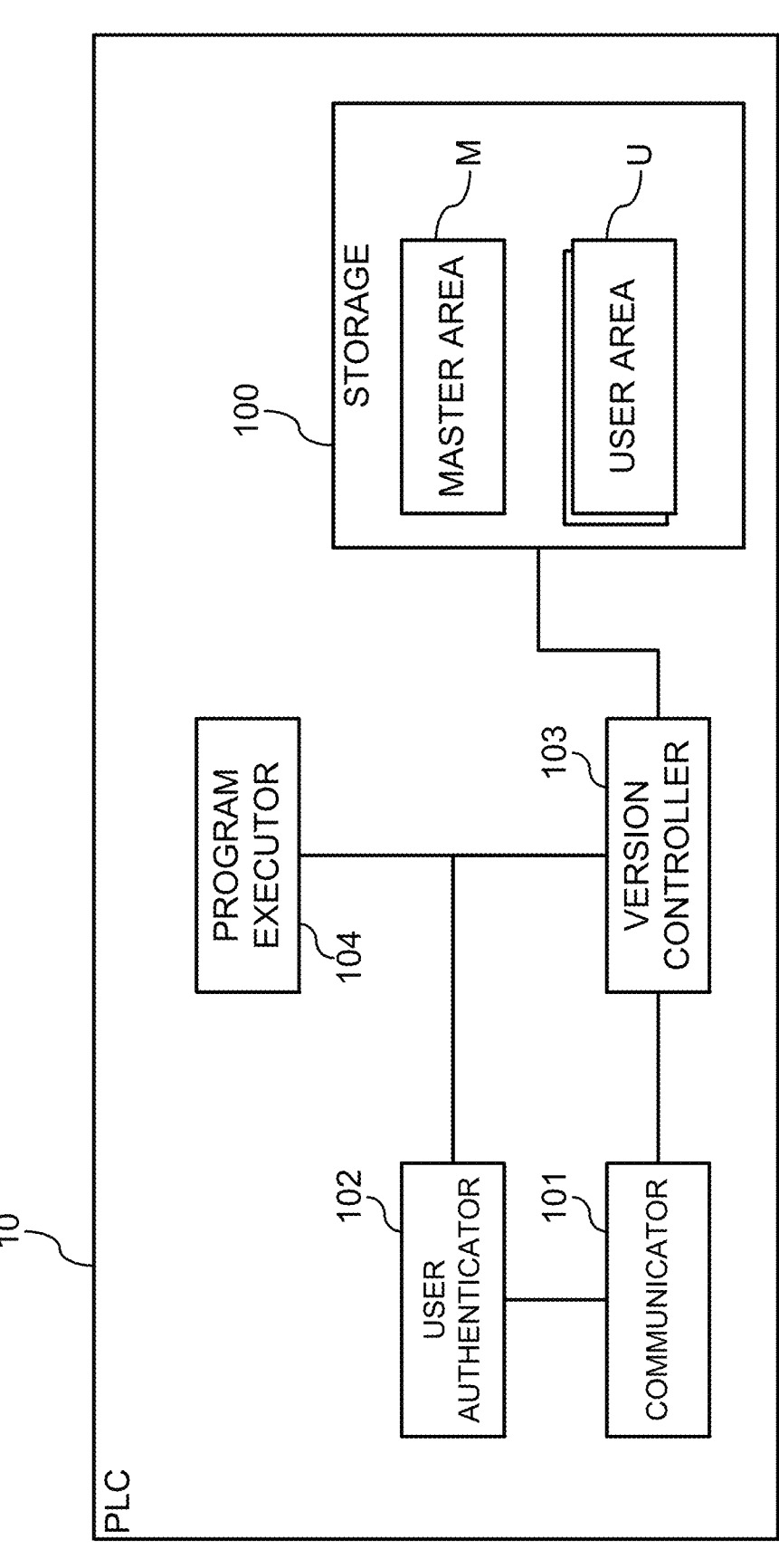
FIG. 3 illustrates functional configuration of a PLC according to Embodiment 1 of the present disclosure.

Next, functional configuration of the PLC 10 is described with reference to FIG. 3. The PLC 10 includes a storage 100, a communicator 101, a user authenticator 102, a version controller 103, and a program executor 104.

The storage 100 stores the datasets based on the version control that is described below and is implemented by the version controller 103. The storage 100 includes a master area M and multiple user areas U that are each provided for the corresponding user. The storage 100 is an example of storage means according to the present disclosure. The master area M is an example of a master area according to the present disclosure. The user area U is an example of a user area according to the present disclosure.

The communicator 101 communicates with the development device 20. The communicator 101 is, for example, a network interface. The communicator 101 is an example of communication means according to the present disclosure.

The user authenticator 102 authenticates a user corresponding to the development device 20 that is a communication target of the communicator 101. The user authenticator 102 authenticates the user by, for example, password authentication. In another example, the configuration may be employed in which an administrator of the PLC 10 preregisters for each development device 20 the corresponding user in the PLC 10 and the user authenticator 102 automatically performs user authentication by identifying the development device 20. The user authenticator 102 is an example of user authenticating means according to the present disclosure.

The version controller 103 implements version control of the datasets received by the communicator 101. The version controller 103 stores and controls the datasets separately in the master area M and each user area U. The version controller 103 stores, in the user area U corresponding to a user having made the update, a dataset with the dataset stored in the master area M as the immediate parent. Thus, the dataset to be stored is a dataset that is a "branch" from the dataset in the master area M. Additionally, in principle, the dataset with the dataset stored in the user area U as the immediate parent is caused by the version controller 103 to be stored in the user area U. Thus, in principle, the dataset transmitted by the user is stored in the user area U.

In contrast, when the user performs the work for applying the dataset stored in the own user area U to the master area M, the version controller 103 stores this dataset in the master area M. In the case where the root parent of the dataset that the user attempts to apply to the master area M is different from that of the latest dataset stored in the master area M, the version controller 103 rejects the application by the user. In this case, the user performs a work for merging the latest dataset stored in the master area M and the own dataset.

When storing a dataset in the master area M or the user area U, the version controller 103 stores, in addition to the dataset itself, metadata for individual identification of the dataset and metadata indicating a dataset as the immediate parent of the dataset that is a target of storage, in association with the dataset itself. For example, in the case of treating the dataset itself as a piece of binary data, a hash value of this binary data may be used as the metadata. Since this configuration enables storing a dataset while associating the dataset with a dataset as the immediate parent, management of parent-child relationships among datasets can be achieved, and thus version control of the datasets as a whole can be achieved. The version controller 103 is an example of version controlling means according to the present disclosure.

The program executor 104 loads the program stored in the storage 100 via the version controller 103 and executes the loaded program. For example, the program executor 104 loads and executes the program included in the latest dataset stored in the storage 100. In another example, the program executor 104 loads and executes the program included in the dataset specified by the user. For example, due to work process reasons, a case can occur in which the source code is temporarily uncompilable and thus no executable file is included in the latest dataset. In such cases, the user needs to specify the dataset that includes an executable file.

Additionally, the program executor 104 causes a log relating to execution of a program to be stored in the storage 100 in association with the dataset corresponding to the executed program. The log relating to the execution of the program includes, for example, information indicating a date and time of execution, information relating to an event or error that has occurred at the execution of the program, information indicating the dataset corresponding to the executed program, and the like. For example, by analyzing this log, the user can evaluate a quality of the program for each dataset.

Next, an example of hardware configuration of the PLC 10 is described with reference to FIG. 4. The PLC 10 is a programmable logic controller and thus is one type of a computer.

The PLC 10 includes a processor 1001, a memory 1002, an interface 1003, and a secondary storage 1004 that are connected with one another via a bus 1000.

The processor 1001 is, for example, a central processing unit (CPU). The functions of the PLC 10 are achieved by the processor 1001 that loads an operational program stored in the secondary storage 1004 into the memory 1002 and executes the program. The processor 1001 may include, separately from the processor to execute the operational program, a processor to load and execute the dataset stored in the storage 100. In this case, the latter processor achieves the functions of the program executor 104.

The memory 1002 is, for example, a main storage including a random access memory (RAM). The memory 1002 stores the operational program loaded by the processor 1001 from the secondary storage 1004. The memory 1002 serves as a working memory when the processor 1001 executes the operational program.

The interface 1003 is an input/output (I/O) interface, such as serial port, universal serial bus (USB) port, or network interface, for example. The interface 1003 achieves the functions of the communicator 101.

The secondary storage 1004 is, for example, a flash memory, a hard disk drive (HDD), or a solid state drive (SSD). The secondary storage 1004 stores the operational program to be executed by the processor 1001. The secondary storage 1004 achieves the functions of the storage 100.

Figure 5:
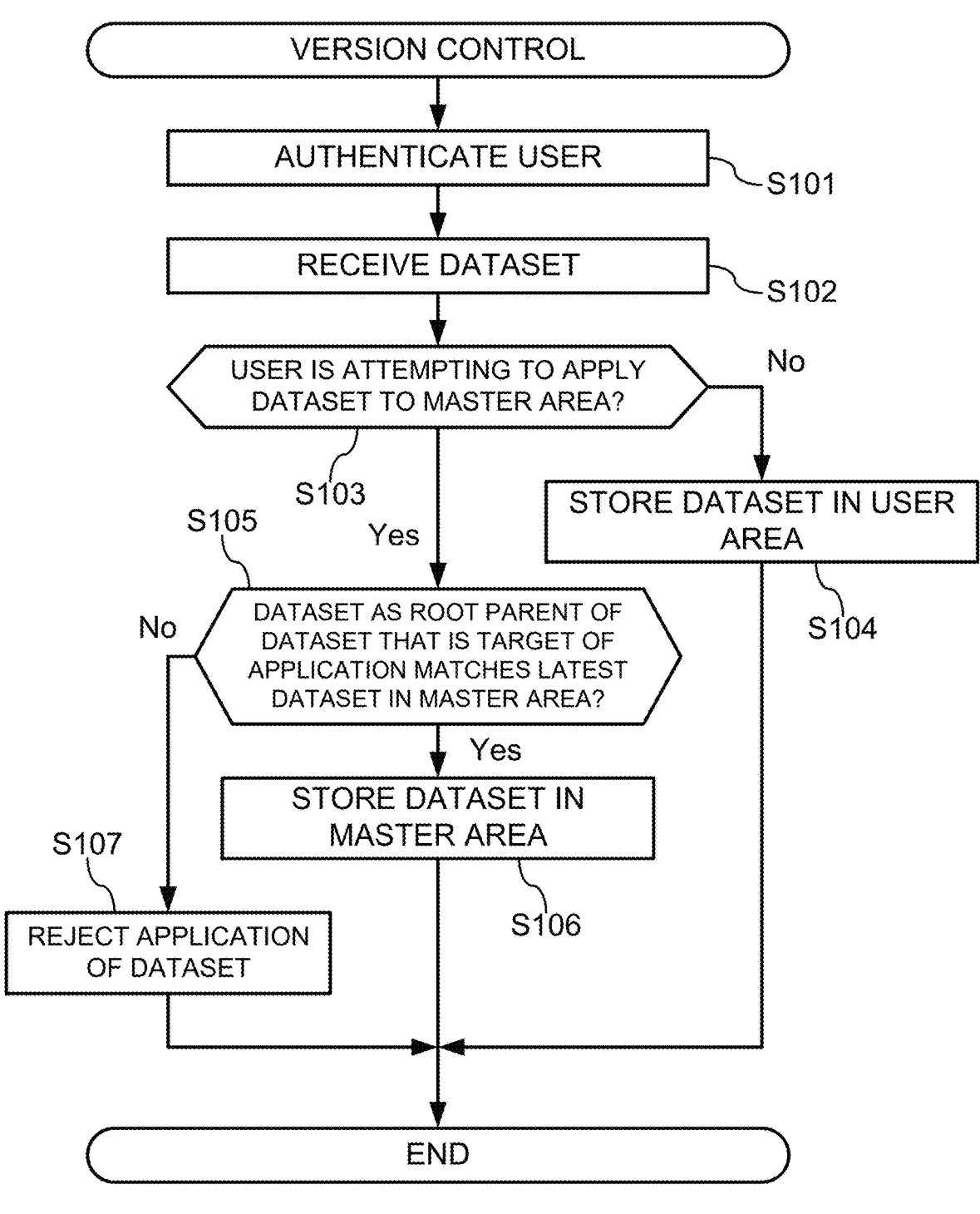
FIG. 5 is a flowchart illustrating an example of an operation of version control by the PLC according to Embodiment 1 of the present disclosure.

Next, an example of operations of the version control by the PLC 10 is described with reference to FIG. 5. The operation illustrated in FIG. 5 is executed, for example, upon the development device 20 being operated by the user and starting communication for transmission of the dataset to the PLC 10.

The user authenticator 102 of the PLC 10 communicates with the development device 20 and authenticates the user of the development device 20 (step S101). Through this operation, the user having transmitted the dataset is specified.

Upon the authentication of the user, the development device 20 transmits the dataset to the PLC 10, and the communicator 101 of the PLC 10 receives the transmitted dataset (step S102).

The version controller 103 of the PLC 10 determines whether the user is attempting to apply the dataset to the master area M (step S103).

When the user is not attempting to apply the dataset to the master area M (NO in step S103), the version controller 103 causes the dataset received in step S102 to be stored in the user area U corresponding to the user authenticated in step S101 (step S104). In this operation, in the case where the immediate parent of the dataset to be stored is the dataset in the master area M, the dataset to be stored is a dataset that is a "branch" from the dataset in the master area M. Then the PLC 10 ends the operation of the version control.

When the user is attempting to apply the dataset to the master area M (YES in step S103), the version controller 103 determines whether the dataset as the root parent of the dataset that is the target of the application matches the latest dataset in the master area M (step S105).

When the dataset as the root parent of the dataset that is the target of the application matches the latest dataset in the master area M (YES in step S105), the version controller 103 causes the dataset that is the target of the application to be stored in the master area M (step S106). Then the PLC 10 ends the operations of the version control.

When the dataset as the root parent of the dataset that is the target of the application does not match the latest dataset in the master area M (NO in step S105), the version controller 103 rejects the application of the dataset to the master area M (step S107). Then the PLC 10 ends the operations of the version control.

The version control system 1 according to Embodiment 1 is described above. The PLC 10 of the version control system 1 implements version control through separate storage of the datasets in the master area M and the user areas U. This configuration allows each user to focus only on the datasets in the master area M and the datasets in the user area U corresponding to the user when developing a program, thereby enabling easy version control operations in an environment where multiple people are involved in development.

Modification of Embodiment 1

Figure 6:
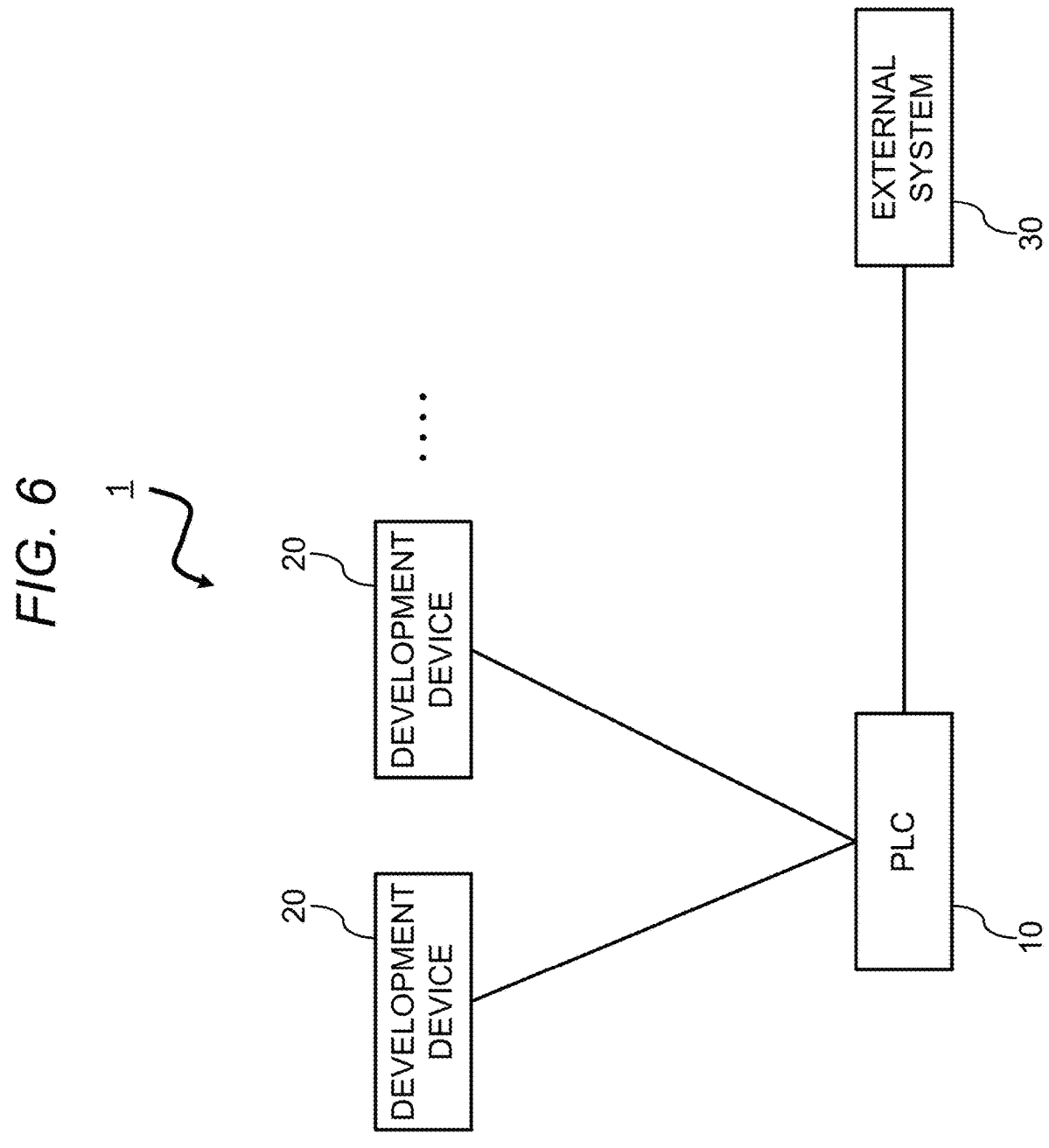
FIG. 6 illustrates overall configuration of a version control system according to a modification of Embodiment 1 of the present disclosure.

In Embodiment 1, the configuration may be employed in which the PLC 10 is communicably connected to an external system 30 as illustrated in FIG. 6 and the version controller 103 of the PLC 10 makes a backup through transmission of the datasets stored in the storage 100 to the external system 30 at a predetermined timing. The timing of the backup may be a timing at which a new dataset is added, or the backup may be made regularly.

Furthermore, the configuration may be employed in which not the PLC 10 but the development device 20 is communicably connected to the external system 30 and the development device 20 makes a backup by loading the datasets stored in the storage 100 of the PLC 10 and transmitting these datasets to the external system 30. This configuration can be employed in, for example, a case where the development device 20 is connectable to the Internet but the PLC 10 is unconnectable to the Internet.

In Embodiment 1, each user is taken to be accessible to the dataset in the user area U corresponding to the user and is taken to be inaccessible to the dataset in the user area U corresponding to other user. The dataset in each user area U may be encrypted with an encryption key corresponding to the user, rather than simply being made inaccessible.

Furthermore, the dataset in the master area M may be encrypted with an encryption key unique to the PLC 10. This configuration prevents a third party from knowing the content of the dataset stored in the master area M even in the case of leakage of the dataset for some reason, since a person who does not own the PLC 10 is unable to decrypt the dataset in the master area M.

In embodiment 1, the user can apply the dataset in the user area U to the master area M at any timing on condition that no competition occurs with respect to the latest dataset in the master area M. On the other hand, if the dataset continues to be updated without applying it to the master area M at all, the discrepancy between the content of the dataset in the master area M and the content of the datasets in the user area U increases and thus may hinder development. Thus, for example, the version controller 103 may issue a warning to the user when the dataset has been updated more than a certain number of times in the user area U. For example, the version controller 103 transmits data indicating a warning to the development device 20 via the communicator 101, and the development device 20 sends notification of the warning to the user.

Embodiment 2

Hereinafter, a version control system 1 according to Embodiment 2 is described. The overall configuration of the version control system 1 according to Embodiment 2 is similar to that of Embodiment 1 illustrated in FIG. 1. Embodiment 2 is different from Embodiment 1 in that the development device 20 also implements version control of the dataset.

This configuration eliminates the need for the user to transmit the dataset to the PLC 10 at every change. For example, the user may send, after multiple changes of the dataset and completion of necessary changing work, multiple datasets corresponding to the multiple changes collectively to the PLC 10.

Figure 2:
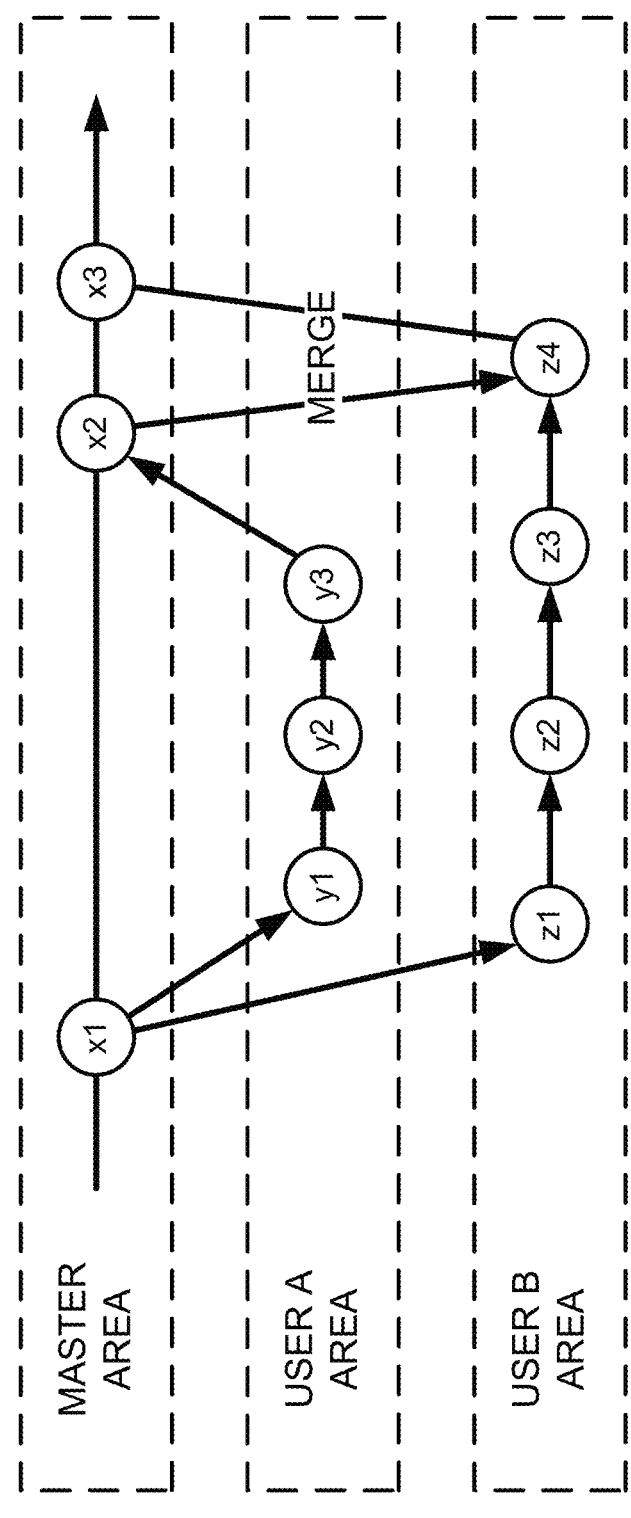
FIG. 2 illustrates an example of version control by the version control system according to Embodiment 1 of the present disclosure.

For example, in the example illustrated in FIG. 2 according to Embodiment 1, the user A updates the dataset by transmitting, for each update corresponding to the datasets y1, y2, or y3, the dataset corresponding to the update to the PLC 10. In contrast, according to Embodiment 2, once the user A acquires the dataset x1, the user A can then perform changing work on the datasets y1, y2, and y3 without communication with the PLC 10 and thus can apply the dataset y3 to the master area M by transmitting the datasets y1, y2, and y3 collectively to the PLC 10.

Figure 7:
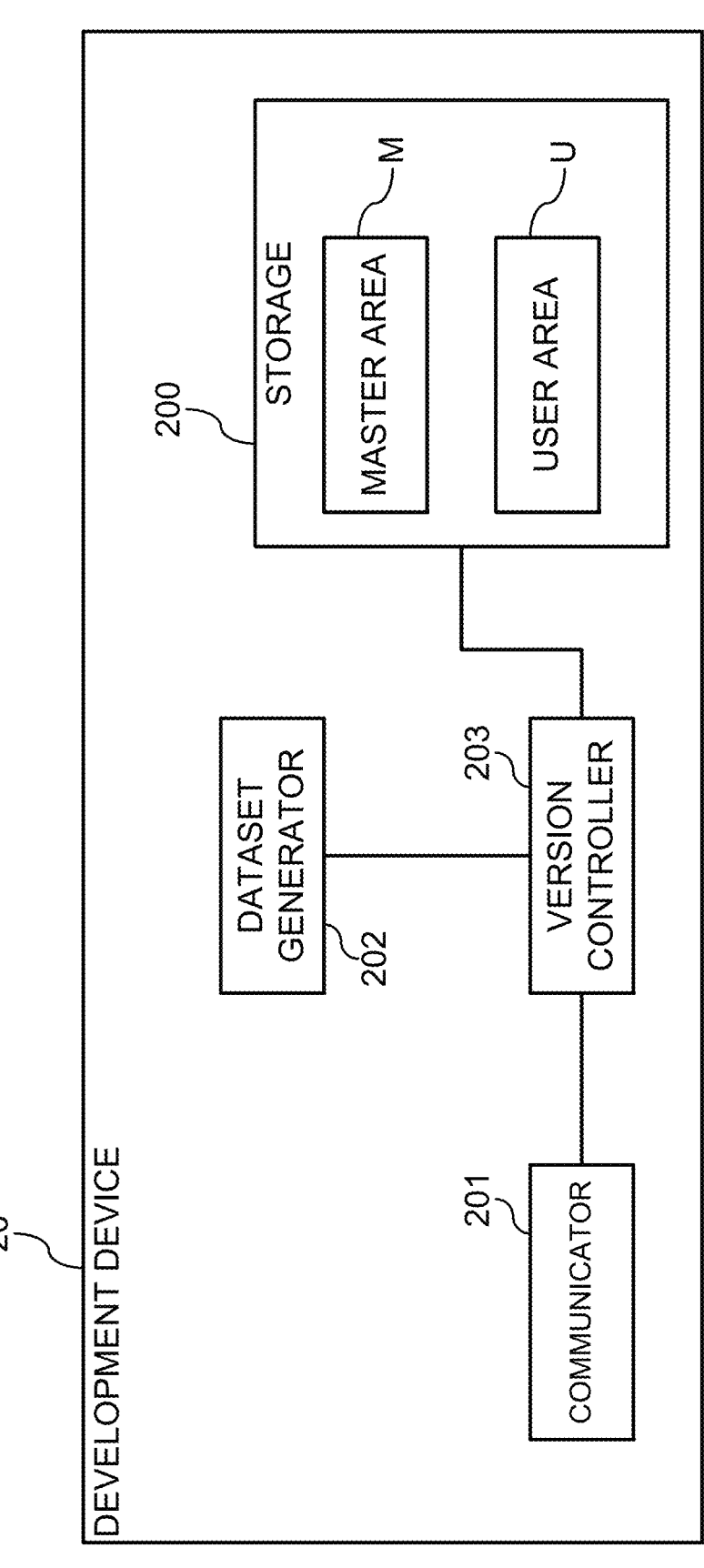
FIG. 7 illustrates functional configuration of a development device according to Embodiment 2 of the present disclosure.

The functional configuration of the development device 20 according to Embodiment 2 is described with reference to FIG. 7. The development device 20 according to Embodiment 2 includes a storage 200, a communicator 201, a dataset generator 202, and a version controller 203.

The storage 200 stores the datasets based on the version control that is described below and is implemented by the version controller 203. The storage 200 includes the master area M and the user area U. Unlike the storage 100 of the PLC 10, only one user area U corresponding to the user of the development device 20 is included.

The communicator 201 communicates with the PLC 10. Based on the control of the version controller 203 described below, the communicator 201 transmits the dataset created by the user with the development device 20 to the PLC 10 and receives the dataset stored in the storage 100 from the PLC 10. The communicator 201 is achieved by, for example, a network interface.

The dataset generator 202 generates, based on user operation via a non-illustrated input device, the program to be executed by the PLC 10 and data relating to this program. That is, the dataset generator 202 generates the dataset based on user operation. The dataset generator 202 has an editing function for describing, for example, a source code, a configuration file, a document, and the like.

The version controller 203 causes the dataset generated by the dataset generator 202 to be stored in the user area U of the storage 200 and implements version control. Similarly to the version controller 103 of the PLC 10, when storing a dataset, the version controller 203 stores, in addition to the dataset itself, metadata for individual identification of the dataset and metadata indicating a dataset as the immediate parent of the dataset that is a target of storage, in association with the dataset itself. This configuration leads to version control, in the development device 20, of the dataset created by the user.

Of the datasets stored in the user area U of the storage 200, one or more datasets that are not yet transmitted to the PLC 10 are collectively transmitted by the version controller 203 to the PLC 10 via the communicator 201. This configuration enables synchronizing content of the changing work performed by the user on the development device 20 with the PLC 10.

The version controller 203 acquires, via the communicator 201, of the datasets stored in the master area M of the storage 100 of the PLC 10, one or more datasets that are not yet stored in the master area M of the storage 200, and stores in the master area M of the storage 200. This configuration enables synchronizing content of the change made in the master area M of the PLC 10 with the development device 20.

Here, the point that differentiates the PLC 10 according to Embodiment 2 from that of Embodiment 1 is described. As described above, multiple datasets are transmittable to the PLC 10 by the development device 20 according to Embodiment 2. Additionally, as described above, the development device 20 according to Embodiment 2 acquires the dataset from the PLC 10 in the master area M. Thus, the version controller 103 according to Embodiment 2 has functions corresponding to these configurations. The version controller 103 according to Embodiment 2 collectively receives multiple datasets from the development device 20 and stores the received datasets collectively in the user area U of the storage 100. The version controller 103 according to Embodiment 2 transmits, to the development device 20, in response to a request from the development device 20, one or more datasets in the master area M.

The functions of the version controller 203 of the development device 20 and the functions of the version controller 103 of the PLC 10 enable implementing version control of the dataset separately in the PLC 10 and the development device 20 while achieving necessary synchronization between the PLC 10 and the development device 20. Thus, with the version control system 1 according to Embodiment 2, distributed version control can be achieved.

Hereinafter, a specific example is described with reference to the drawings. Initially, assume that only a dataset x1 is stored in the storage 100 of the PLC 10 and no dataset is stored in the storage 200 of the development device 20.

Figure 8:
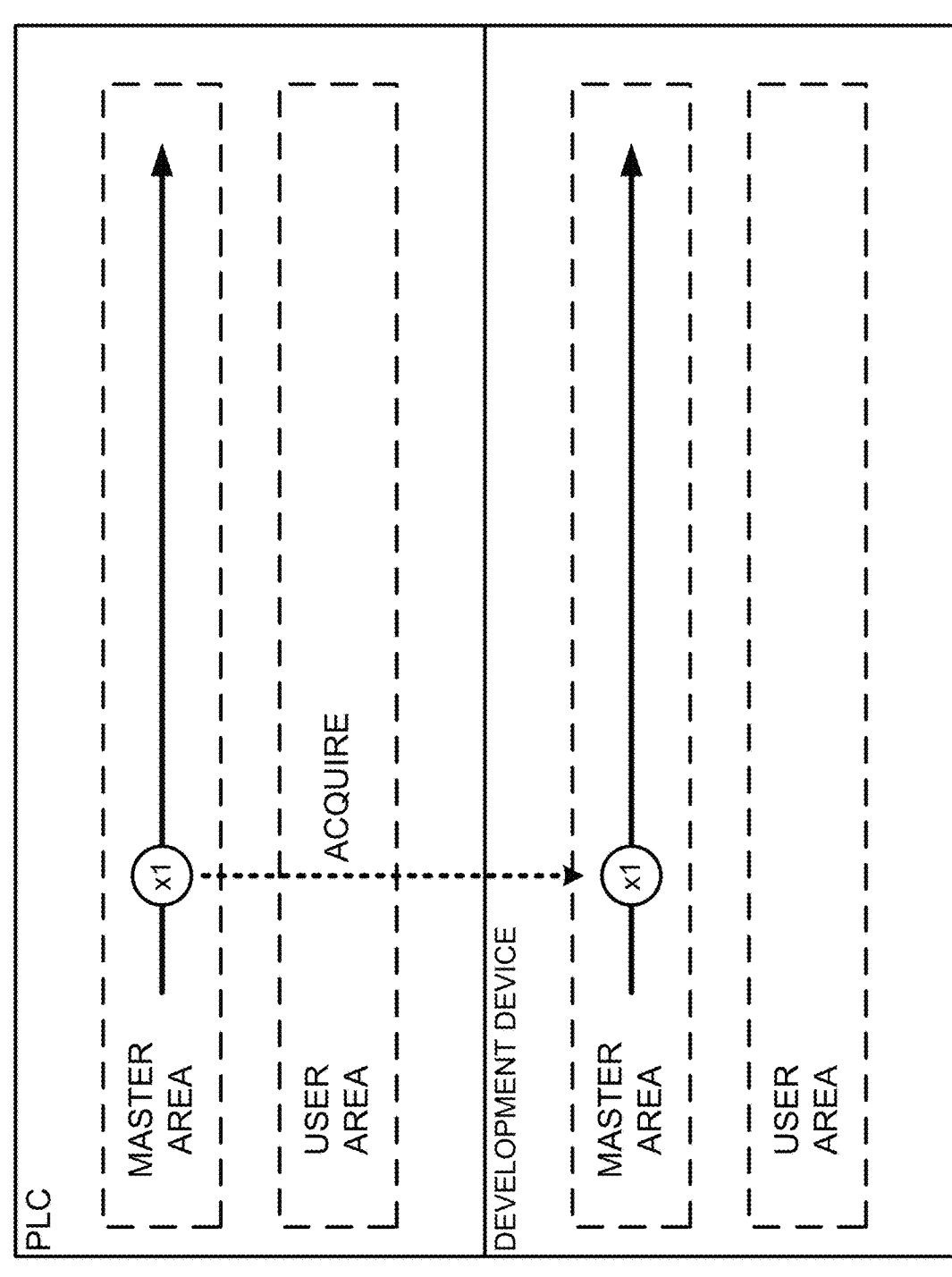
FIG. 8 is a diagram for explanation of an example of distributed version control by a version control system according to Embodiment 2 of the present disclosure.

First, based on user operation, the version controller 203 of the development device 20 acquires from the PLC 10 the dataset x1 stored in the storage 100 and stores in the master area M of the storage 200. This causes the dataset x1 to be stored in the master area M of the storage 200 of the development device 20, as illustrated in FIG. 8.

Figure 9:
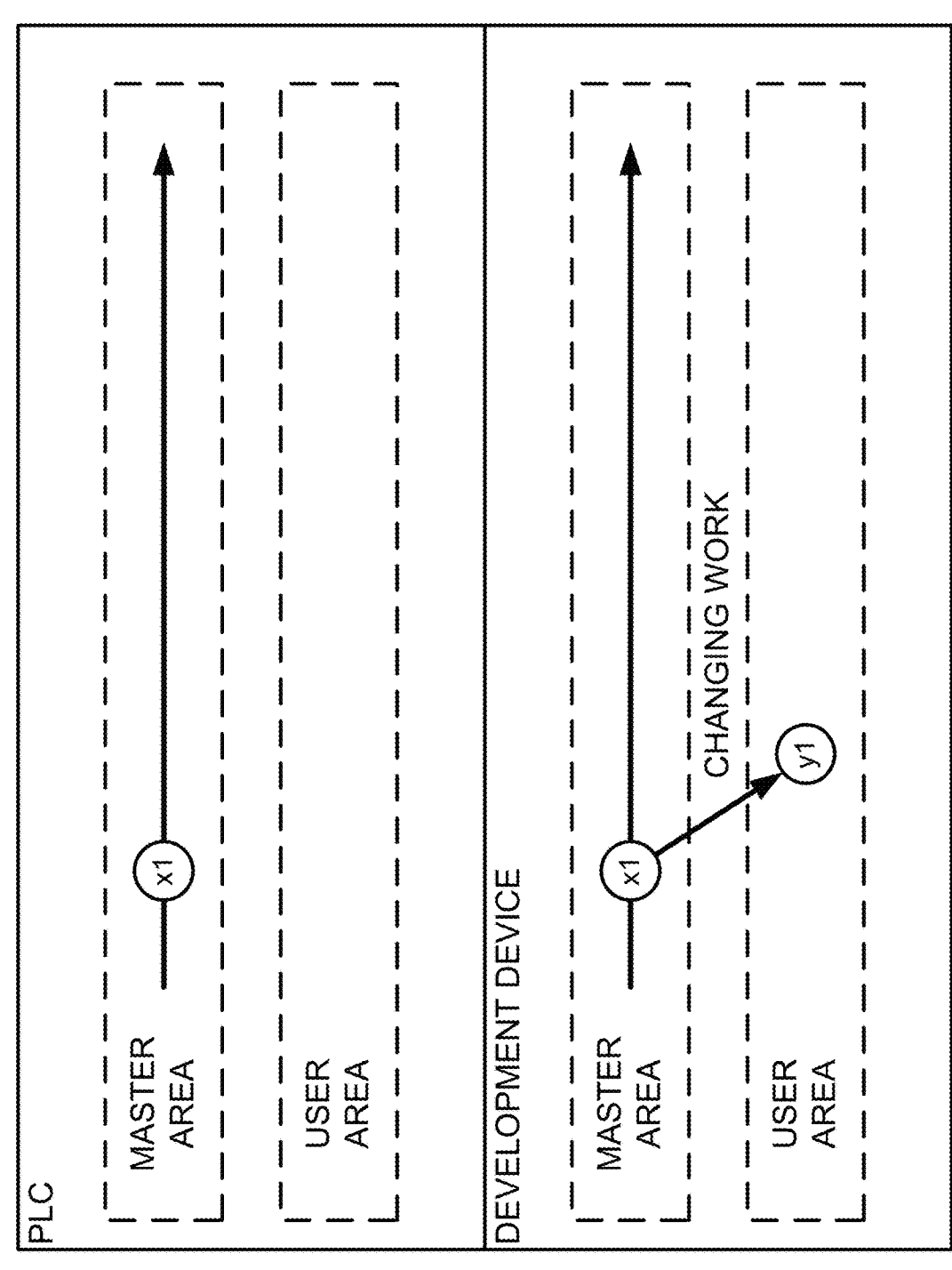
FIG. 9 is a diagram for explanation of the example of the distributed version control by the version control system according to Embodiment 2 of the present disclosure.

Then the user of the development device 20 performs changing work on the dataset x1. This causes the dataset generator 202 of the development device 20 to generate a new dataset, and as illustrated in FIG. 9, the version controller 203 stores this new dataset as a dataset y1 in the user area U of the storage 200. At this phase, since no communication is performed between the PLC 10 and the development device 20, no particular change occurs in the storage 100 of the PLC 10.

Figure 10:
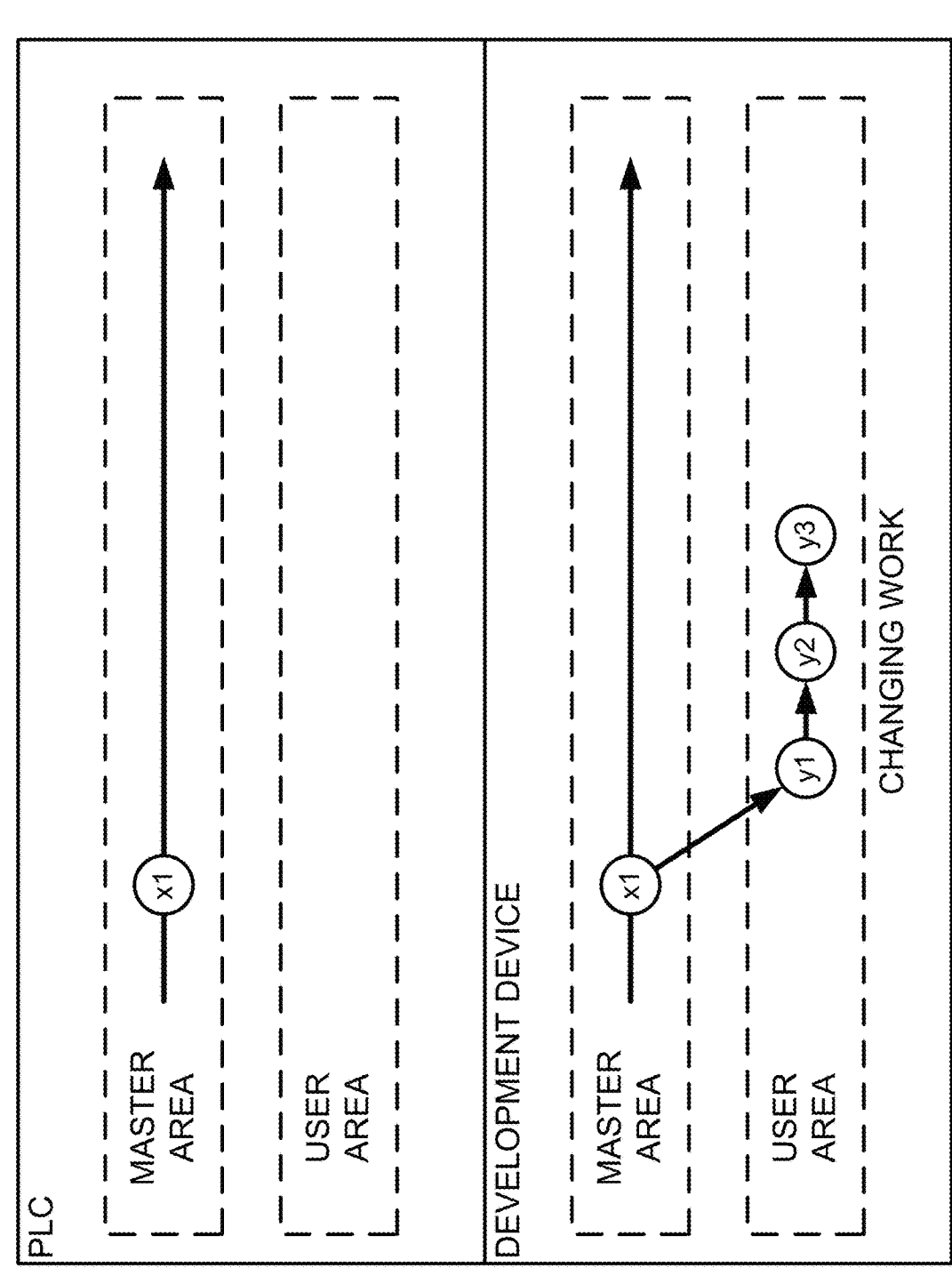
FIG. 10 is a diagram for explanation of the example of the distributed version control by the version control system according to Embodiment 2 of the present disclosure.

Thereafter, the user performs two changing works, and the datasets y2 and y3 are stored in the user area U of the storage 200, as illustrated in FIG. 10. At this phase, there is still no particular change in the storage 100 of the PLC 10.

Figure 11:
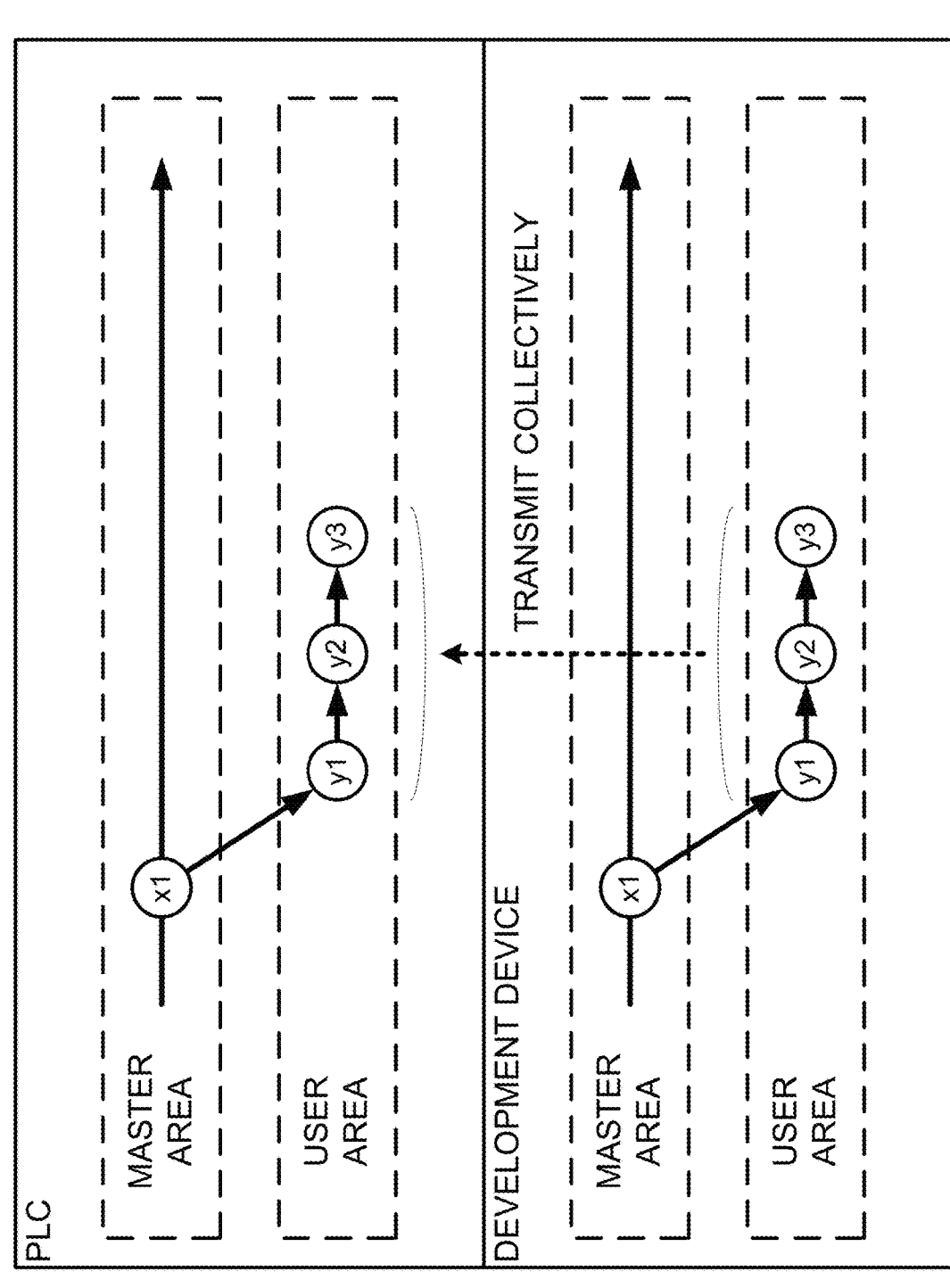
FIG. 11 is a diagram for explanation of the example of the distributed version control by the version control system according to Embodiment 2 of the present disclosure.

Then, based on user operation, the version controller 203 collectively transmits the datasets y1, y2 and y3 stored in the user area U of the storage 200 to the PLC 10. The version controller 103 of the PLC 10 stores the received datasets y1, y2 and y3 in the user area U of the storage 100, as illustrated in FIG. 11. At this stage, the first synchronization is performed between the development device 20 and the PLC 10.

Figure 12:
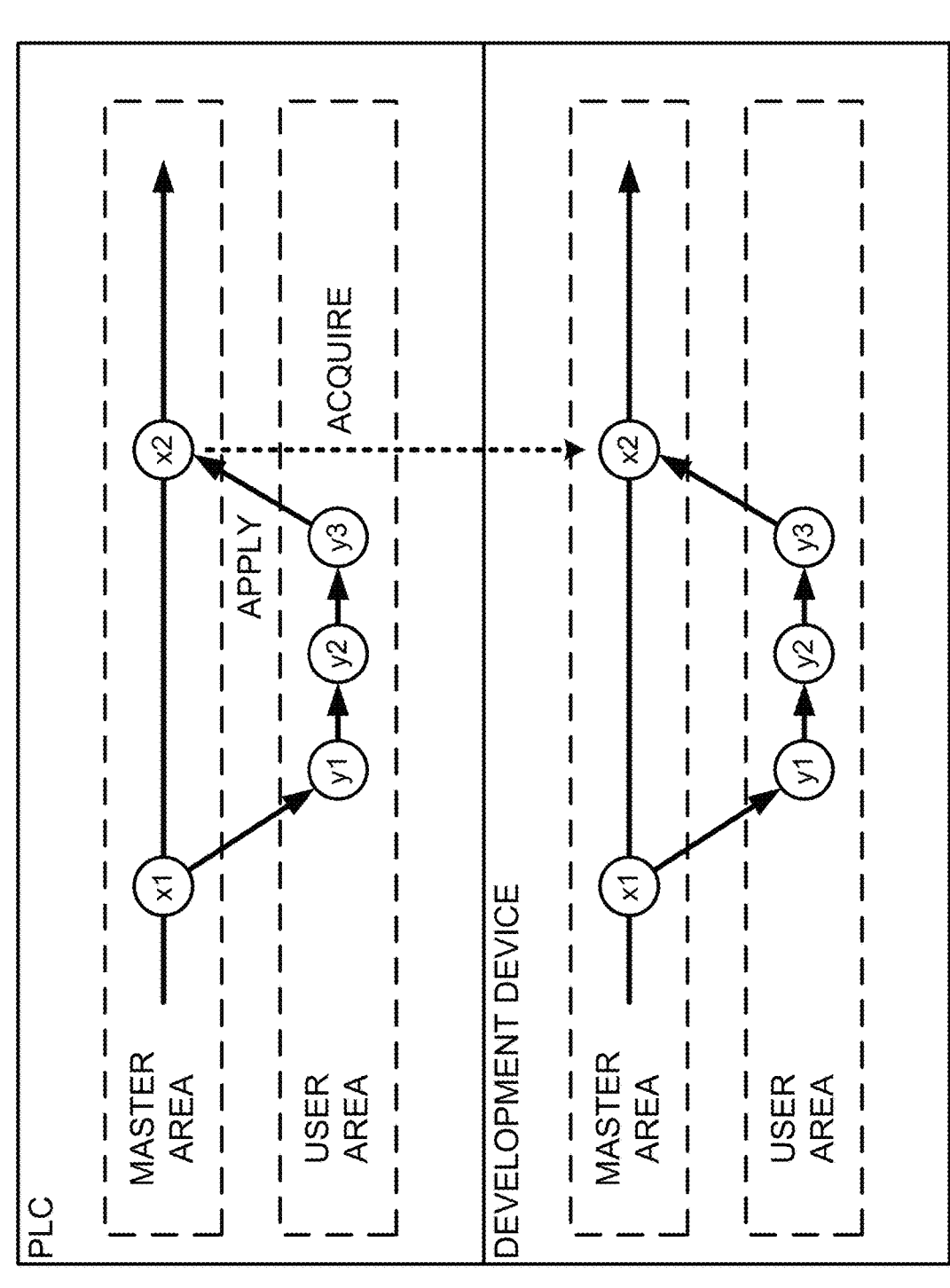
FIG. 12 is a diagram for explanation of the example of the distributed version control by the version control system according to Embodiment 2 of the present disclosure.

Then the user performs an operation for applying the dataset y3 to the master area of the storage 100 of the PLC 10 to thereby store, in the master area M of the storage 100, a dataset x2 that is the same as the dataset y3 in content thereof. Thereafter, the version controller 203 of the development device 20 acquires from the PLC 10 the dataset x2 stored in the master area M of the storage 100 and stores in the master area M of the storage 200. This allows both the PLC 10 and the development device 20 to implement version control with the datasets x1, x2, y1, y2, and y3, as illustrated in FIG. 12.

Note that, as in the example described with the datasets z3, x2, z4 and x3 of FIG. 2, a case may occur in which the dataset in the user area U is inapplicable as is due to occurrence of a competition when attempt to apply to the master area M is performed. In this case, firstly, the version controller 203 of the development device 20 acquires from the PLC 10 the dataset stored in the master area M of the storage 100 and stores in the master area M of the storage 200. Then, the user performs a work for merging with respect to the dataset stored in the master area M of the storage 200 to thereby cause the dataset generator 202 to generate a dataset, and the version controller 203 stores this dataset in the user area U of the storage 200. Then the version controller 203 transmits to the PLC 10 the new dataset stored in the user area U of the storage 200 and stores, in the user area U of the storage 100, the dataset received by the version controller 103 of the PLC 10. The user can then try again to apply the dataset of the user area U to the master area M.

Similarly to Embodiment 1, the program executor 104 of the PLC 10 executes the program included in the dataset stored in the storage 100. This allows the user to easily control consistency between the source code as the target of version control and the program to be executed by the PLC 10.

Figure 4:
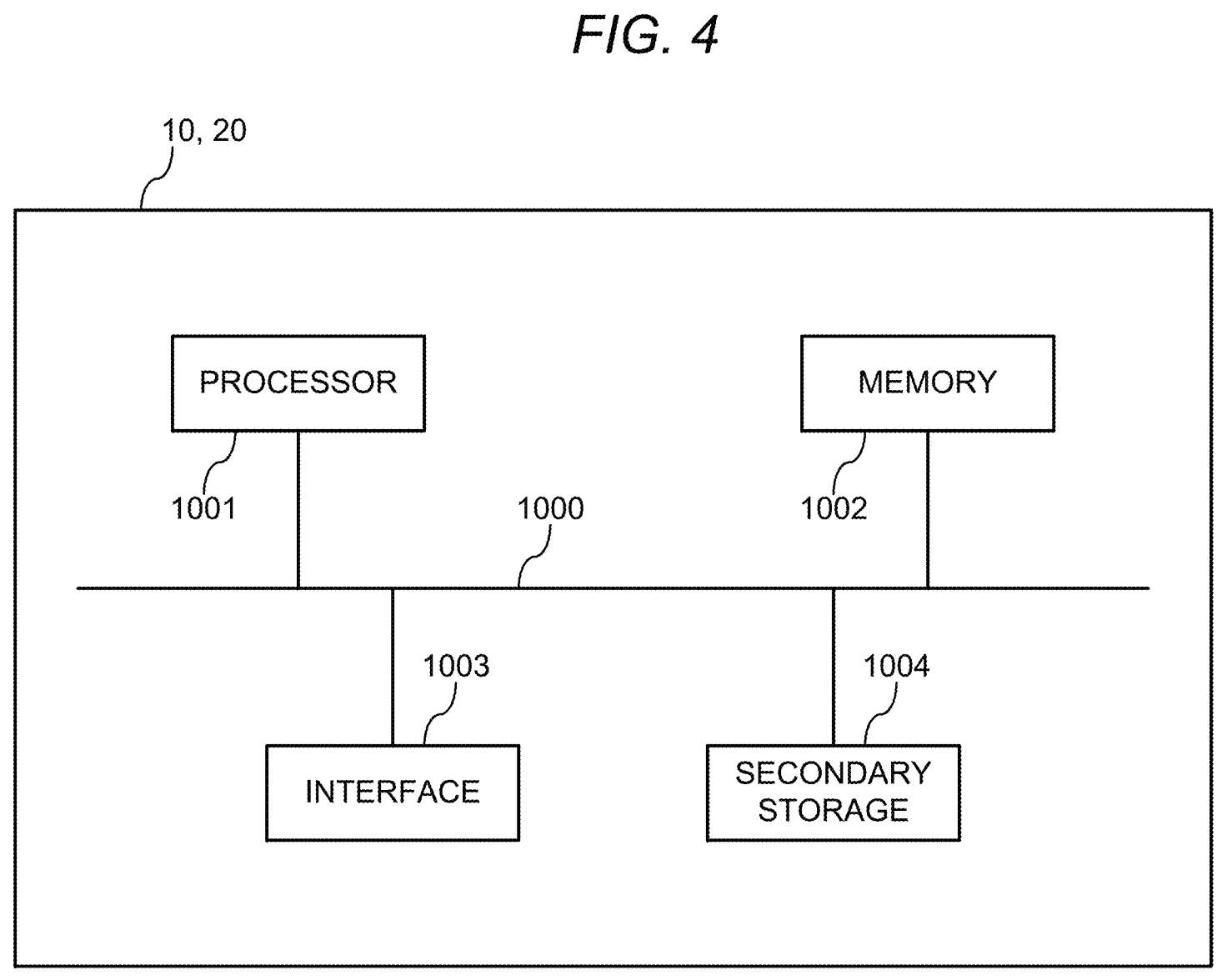

The hardware configuration of the development device 20 according to Embodiment 2 is substantively similar to that illustrated in FIG. 4. This is because the development device 20 is, for example, a personal computer in which a program as an engineering tool is installed, as described in Embodiment 1.

The version control system 1 according to Embodiment 2 is described above. The version control system 1 according to Embodiment 2 enables implementing version control of the datasets separately in the PLC 10 and the development device 20 while achieving necessary synchronization between the PLC 10 and the development device 20. Thus, with the version control system 1 according to Embodiment 2, distributed version control can be achieved. Furthermore, similarly to Embodiment 1, the PLC 10 executes the program included in the dataset stored in the storage 100. This allows the user to easily control consistency between the source code as the target of version control and the program to be executed by the PLC 10. Thus, with the version control system 1 according to Embodiment 2, distributed version control of data relating to the programmable device can be easily achieved.

Furthermore, due to the configuration of controlling the datasets separately in the master area M and the user area U, the user is taken to, when attempting to merge the dataset generated thereby, check the dataset in the user area U and the dataset in the master area M and make a determination before merging. Thus, the configuration of controlling the dataset separately in the master area M and the user area U enables providing the user with a natural opportunity to make a decision without placing a large burden on the user for merging, and therefore enables avoidance of a circumstance in which the datasets are unintentionally merged. For example, unintentional merging of datasets that have not been debugged can be achieved.

Modification of Embodiment 2

In Embodiment 2, since Embodiment 2 is a modification of Embodiment 1, multiple users are taken to be involved similarly to Embodiment 1. However, even in the case where only one user is involved in Embodiment 2, distributed version control of datasets can be achieved with the development device 20 of the user and the PLC 10. In this case, the storage 100 of the PLC 10 is taken to include the master area M and one user area U, and the PLC 10 does not necessarily need to include the user authenticator 102.

Furthermore, in Embodiment 2, a configuration is conceivable in which control of the datasets is implemented with one area without separation into the master area M and the user area U. An example according to this configuration is described below in which each of multiple users creates a dataset with the corresponding development device 20 and performs the update through transmission of the created dataset to the PLC 10.

Figure 13:
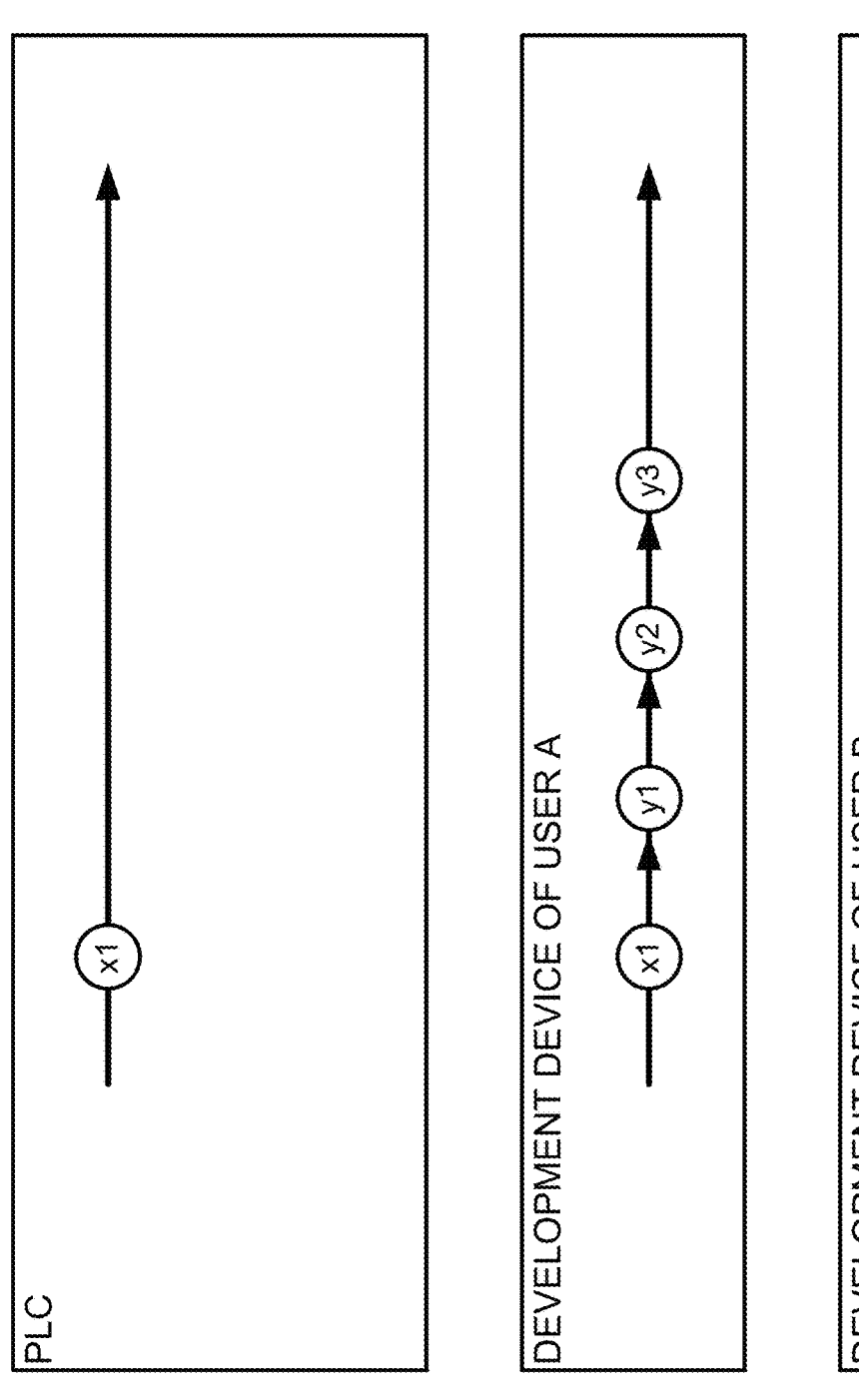
FIG. 13 is a diagram for explanation of an example of distributed version control by a version control system according to a modification of Embodiment 2 of the present disclosure.
Figure 14:
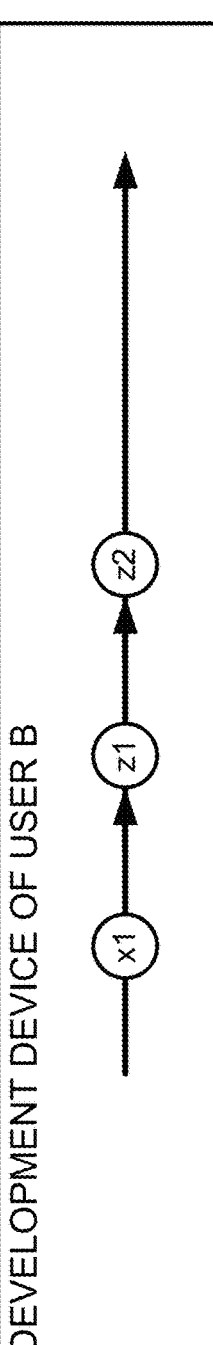
FIG. 14 is a diagram for explanation the example of the distributed version control by the version control system according to the modification of Embodiment 2 of the present disclosure.

FIG. 13 illustrates a case in which each of the user A and user B performs development with the corresponding development device 20 based on the dataset x1 stored in the storage 100 of the PLC 10. The user A creates the datasets y1, y2, and y3, and the user B creates the datasets z1 and z2. Next, suppose that the user A updates the dataset before the user B, and then the user B updates the dataset. In this case, as illustrated in FIG. 14, the datasets y1, y2, and y3 of the user A who updated the dataset earlier are stored in the storage 100 of PLC 10 as they are. The line where the datasets x1, y1, y2, and y3 are stored is a so-called "master line". Then the datasets z1 and z2 of the user B who updated the dataset below than the user A are stored in the storage 100 of PLC 10 as a branch from the master line. In this way, distributed version control by multiple users can be achieved without separation into the master area M and the user area U, by applying the update of the datasets on a "first-come, first-served" basis and storing the datasets that have not undergone the earliest update as a branch from the master line. Merging of y3 and z2 can be made similarly to Embodiments 1 and 2.

Furthermore, in Embodiment 2, in the case where a dataset exists in the user area U that remains unmerged into the master area M for a long period, a warning mail may be send to the user. The warning mail may be sent by, for example, upon authentication of a user by the user authenticator 102, transmission of a mail to this user based on information used for the authentication. Since a dataset that remains unmerged into the master area M for a long period has a high possibility of having a large deviation from the dataset in the master area M, issuing a warning is useful.

Other Modification

In the aforementioned embodiments, the PLC 10 implements version control of the dataset. Programmable devices other than the PLC that include functional elements similar to those of the PLC 10 can implement version control. For example, in development of a program to be executed in a motion unit, the inclusion in the motion unit of functional elements similar to those of the PLC 10 enables version control of the dataset relating to the program to be executed in the motion unit.

In the hardware configuration illustrated in FIG. 4, the PLC 10 and the development device 20 include the secondary storage 1004. This configuration is not limiting, and the configuration may be used in which the secondary storage 1004 is disposed outside the PLC 10 and the development device 20, and the secondary storage 1004, the PLC 10 and the development device 20 are connected via the interface 1003. The secondary storage 1004 according to this configuration may be a removable medium, such as USB flash drive or memory card.

In place of the hardware configuration illustrated in FIG. 4, the PLC 10 and the development device 20 may each include a dedicated circuit including an application-specific integrated circuit (ASIC) or a field-programmable gate array (FPGA). In the hardware configuration illustrated in FIG. 4, some functions of the PLC 10 and the development device 20 may be achieved by, for example, a dedicated circuit connected to the interface 1003.

The programs used in the PLC 10 and the development device 20 may be distributed on a non-transitory computer-readable recording medium such as a compact disc read-only memory (CD-ROM), a digital versatile disc (DVD), a USB flash drive, a memory card, or an HDD. A specific computer or a general-purpose computer on which the program is installed can function as the PLC 10 or the development device 20.

Furthermore, the aforementioned program may be stored in a storage included in another server on the Internet and downloaded from the server to a computer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Version control system
10 PLC
20 Development device
30 External system
100 Storage
101 Communicator
102 User authenticator
103 Version controller
104 Program executor
200 Storage
201 Communicator
202 Dataset generator
203 Version controller
1000 Bus
1001 Processor
1002 Memory
1003 Interface
1004 Secondary storage
M Master area
U User area

The invention claimed is:

1. A programmable device, comprising:
a storage to include a master area and a plurality of user areas corresponding to a plurality of users;
a user authenticator to authenticate each user of the plurality of users; and
a version controller to cause a first dataset created by the user authenticated by the user authenticator to be stored in the storage and implement version control of the first dataset, wherein
the version controller causes the first dataset to be stored in the master area or a user area of the plurality of user areas that corresponds to the user authenticated by the user authenticator, in association with a second dataset that is already stored in the storage and that serves as an immediate parent of the first dataset, and when the second dataset is stored in the master area, the version controller causes the first dataset to be stored in the user area corresponding to the user authenticated by the user authenticator.

2. The programmable device according to claim 1, wherein
the version controller further makes a backup of the first dataset through transmission of the first dataset stored in the storage to an external system at a predetermined timing.

3. The programmable device according to claim 1, wherein
a dataset stored in each user area of the plurality of user areas corresponding to the plurality of users is accessible only by a user corresponding to the user area.

4. A version control system, comprising:
the programmable device according to claim 1; and
a plurality of development devices corresponding to the plurality of users, wherein
each of the plurality of development devices transmits the first dataset created by the user, and
the programmable device further includes a communicator to receive the first dataset from each of the plurality of development devices.

5. A version control method executable with a programmable device that includes a storage to include a master area and a plurality of user areas corresponding to a plurality of users, the version control method comprising:
authenticating each user of the plurality of users; and
causing a first dataset created by the authenticated user to be stored in the master area or a user area of the plurality of user areas that corresponds to the authenticated user, in association with a second dataset that is already stored in the storage and that serves as an immediate parent of the first dataset, causing the first dataset to be stored in the user area corresponding to the authenticated user when the second dataset is stored in the master area, and implementing version control of the first dataset.

6. A computer-readable medium storing a computer program, which when executed by a computer that includes a storage to include a master area and a plurality of user areas corresponding to a plurality of users, causes the computer to function as:
a user authenticator to authenticate each user of the plurality of users; and
a version controller to cause a first dataset created by the user authenticated by the user authenticator to be stored in the storage and implement version control of the first dataset, wherein
the version controller causes the first dataset to be stored in the master area or a user area of the plurality of user areas that corresponds to the user authenticated by the user authenticator, in association with a second dataset that is already stored in the storage and that serves as an immediate parent of the first dataset, and when the second dataset is stored in the master area, the version controller causes the first dataset to be stored in the user area corresponding to the user authenticated by the user authenticator.

* * * * *